United States Patent
Lee

(10) Patent No.: US 7,301,590 B2
(45) Date of Patent: *Nov. 27, 2007

(54) LIQUID CRYSTAL DISPLAY MODULE AND LIQUID CRYSTAL DISPLAY APPARATUS HAVING THE SAME

(75) Inventor: Sang-Duk Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 48 days.

This patent is subject to a terminal disclaimer.

(21) Appl. No.: 11/151,973

(22) Filed: Jun. 14, 2005

(65) Prior Publication Data

US 2005/0231659 A1    Oct. 20, 2005

Related U.S. Application Data

(63) Continuation of application No. 10/379,013, filed on Mar. 4, 2003, now Pat. No. 6,930,734.

(30) Foreign Application Priority Data

Jun. 19, 2002    (KR) ............... 2002-34214

(51) Int. Cl.
    *G02F 1/1333* (2006.01)
(52) U.S. Cl. .................................. 349/58
(58) Field of Classification Search ................ 349/58, 349/60
    See application file for complete search history.

(56) References Cited

U.S. PATENT DOCUMENTS

| | | | |
|---|---|---|---|
| 6,330,148 B1 | 12/2001 | Won et al. | |
| 6,456,343 B2* | 9/2002 | Kim et al. | 349/58 |
| 6,490,016 B1* | 12/2002 | Koura | 349/58 |
| 6,552,761 B1* | 4/2003 | Seo et al. | 349/58 |
| 6,741,298 B1* | 5/2004 | Won | 349/58 |
| 2001/0050732 A1* | 12/2001 | Okamoto et al. | 349/58 |

OTHER PUBLICATIONS

Text of the First Office Action for Chinese Patent Application No. 03108681.0; Date of Mailing: Dec. 31, 2006; English Translation provided (All references cited in the Office Action provided above).

* cited by examiner

*Primary Examiner*—Michael H. Caley
(74) *Attorney, Agent, or Firm*—Cantor Colburn LLP

(57) ABSTRACT

An LCD module and LCD apparatus is provided capable of preventing a chassis from being damaged by an external impact and reducing a number of parts of an LCD apparatus having the LCD module and a number of assembling processes. The LCD apparatus comprises a clip disposed between a receiving container and a chassis by a screw. The screw is engaged to the receiving container passing through the chassis and clip. The clip may be provided to opposite and portions of the receiving container to reinforce the strength of the chassis.

15 Claims, 9 Drawing Sheets

LIQUID CRYSTAL DISPLAY MODULE AND LIQUID CRYSTAL DISPLAY APPARATUS HAVING THE SAME

CROSS REFERENCE TO RELATED APPLICATIONS

This application is a continuation application of U.S. patent application Ser. No. 10/379,013, filed Mar. 4, 2003, now U.S. Pat. No. 6,930,734 which claims priority to Korean Patent Application 2002-0034214, filed on Jun. 19, 2002, the entire contents of which are incorporated herein by reference.

BACKGROUND OF THE INVENTION

1. Field of the Invention

The invention relates to an LCD (Liquid Crystal Display) module and an LCD apparatus, and more particularly to an LCD module having a reduced size and weight and an LCD apparatus having the same.

2. Description of the Related Art

An LCD apparatus displays image information using a liquid crystal molecule. The LCD apparatus has a lighter weight and a smaller size in comparison with a CRT (Cathode Ray Tube) display apparatus.

The LCD apparatus includes an LCD panel, a backlight assembly, a receiving container, and a chassis. The LCD panel includes two glass substrates and liquid crystal molecule interposed between the two glass substrates and controls the liquid crystal molecule to change light not having the image information into light having the image information. The backlight assembly provides the light having a uniform brightness to the LCD panel. The receiving container receives the backlight assembly and LCD panel. The chassis is combined to the receiving container to prevent the backlight assembly and LCD panel from being deviated and damaged by an external impact.

The weight and thickness of the LCD apparatus are important in determining a quality of the LCD apparatus, specifically, where the LCD apparatus is applied to mobile electrical products.

Various methods, such as, integrating functions of parts, reducing a number of parts, decreasing a thickness of parts and changing a material of parts, have been developed to reduce the weight and thickness of the LCD apparatus. However, there are limitations in reducing the weight and thickness of the chassis (which is one of most heavy parts of the LCD apparatus) because the thickness or weight of the chassis may affect the overall quality of the LCD apparatus.

For example, some parts such as an LCD panel or a lamp of the LCD apparatus may be easily damaged by an external impact when the chassis is thinner or is formed of a lighter material used to reduce the weight or thickness of the LCD apparatus. In this case, the strength of the chassis is lower, and the chassis may not absorb the external impact applied to the LCD apparatus thus failing to properly protect the LCD panel.

BRIEF SUMMARY OF THE INVENTION

The invention provides an LCD module having a reduced weight and an increased strength.

The invention also provides an LCD apparatus having a reduced weight and an increased strength.

In one embodiment of the invention, an LCD module comprises a receiving container comprising a bottom surface and a sidewall extended from an edge portion of the bottom surface to provide a receiving space, the sidewall comprising a first opening formed at a side surface of the sidewall, and a second opening concavely formed at an upper surface of the sidewall; a backlight assembly, received in the receiving space, to generate light; an LCD panel assembly comprising an LCD panel and a Printed Circuit Board (PCB), the LCD panel receiving the light from the backlight assembly and displaying an image using the light and the PCB applying a driving signal to the LCD panel; a clip comprising a burring inserted into the first opening, the clip being fixed to an area corresponding to the first opening of the receiving container, the clip including an engaging portion which is inserted into the second opening of the sidewall; a chassis combined to the receiving container to fix the LCD panel assembly to the receiving container, the chassis comprising a chassis engaging hole corresponding to the burring of the clip; and an engaging screw sequentially screwed into the chassis engaging hole and the burring inserted into the first opening to combine the chassis with the clip and the receiving container.

The clip may comprise a first body portion facing an outer surface of the sidewall, the first body portion comprising the burring; a second body portion extended from the first body portion and combined to a rear surface of the bottom surface of the receiving container; and a third body portion extended from the first body portion and combined to an upper surface of the sidewall of the receiving container, wherein the engaging portion is disposed at an end portion of the third body portion and bent at a selected angle with respect to the third body portion. The receiving container may comprise a first engaging protrusion disposed on the rear surface of the bottom surface and the second body portion comprises a first engaging hole engaged to the first engaging protrusion. The engaging hole may have a cross shape. The receiving container may comprise a third opening disposed on the bottom surface and the second body portion comprises an engaging protrusion inserted into the second opening. The engaging protrusion of the second body portion may be formed by partially cutting the second body portion and by bending the partially cut portion.

The second body portion may comprise a ground portion extended from an end portion of the second body portion such that the second body portion makes contact with the PCB, and the ground portion comprises an engaging hole to pass a screw connecting the ground portion and PCB. The receiving container may comprise a receiving portion to receive the ground portion of the clip. The receiving container may comprise a receiving portion that receives the PCB and screw beneath the bottom surface. The backlight assembly may comprise a lamp to generate the light and an optical sheet to increase brightness distribution of the light emitted from the lamp, and the optical sheet comprises a protruding portion to be combined to the clip. The chassis may comprise a first metal having a first strength and the clip may comprise a second metal having a second strength greater than the first strength. The chassis may comprise aluminum or an aluminum alloy and the clip comprises a stainless steel. The clip may be fixed to two opposite sidewalls of the receiving container to reinforce strength of the chassis. In another embodiment of the invention, an LCD apparatus comprises a receiving container comprising a bottom surface and a sidewall extended from an edge portion of the bottom surface to provide a receiving space, the sidewall comprising a first opening and a protrusion disposed on an outer surface of the sidewall; a backlight assembly, received in the receiving space of the receiving container, to generate light; an LCD panel assembly to change the light emitted from the backlight assembly into an image light having image information to display image; a clip comprising a burring inserted into the first opening, the clip covering an upper and an outer surface of the sidewall and a rear surface of the bottom surface; a chassis combined to the receiving container to fix the LCD panel assembly to the receiving container, the chassis comprising a second opening combined to the protrusion of the receiving container and a chassis engaging hole corresponding to the burring of the clip; an engaging screw sequentially screwed into the chassis engaging hole and the burring inserted into the first opening to combine the chassis with the clip and the receiving container; and a case to receive the receiving container and chassis, the case comprising a third opening corresponding to the burring of the clip and combined to the receiving container by an engaging screw screwed into the burring passing through the third opening and chassis engaging hole.

The LCD apparatus may further comprise a bracket disposed between the case and chassis, the bracket comprising a bracket engaging hole corresponding to the chassis engaging hole.

The invention provides that a clip may be disposed between a receiving container and chassis to reinforce the strength of the chassis, thereby preventing the chassis from being damaged by an external impact and reducing a number of parts of an LCD apparatus having the LCD module and a number of assembling processes.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
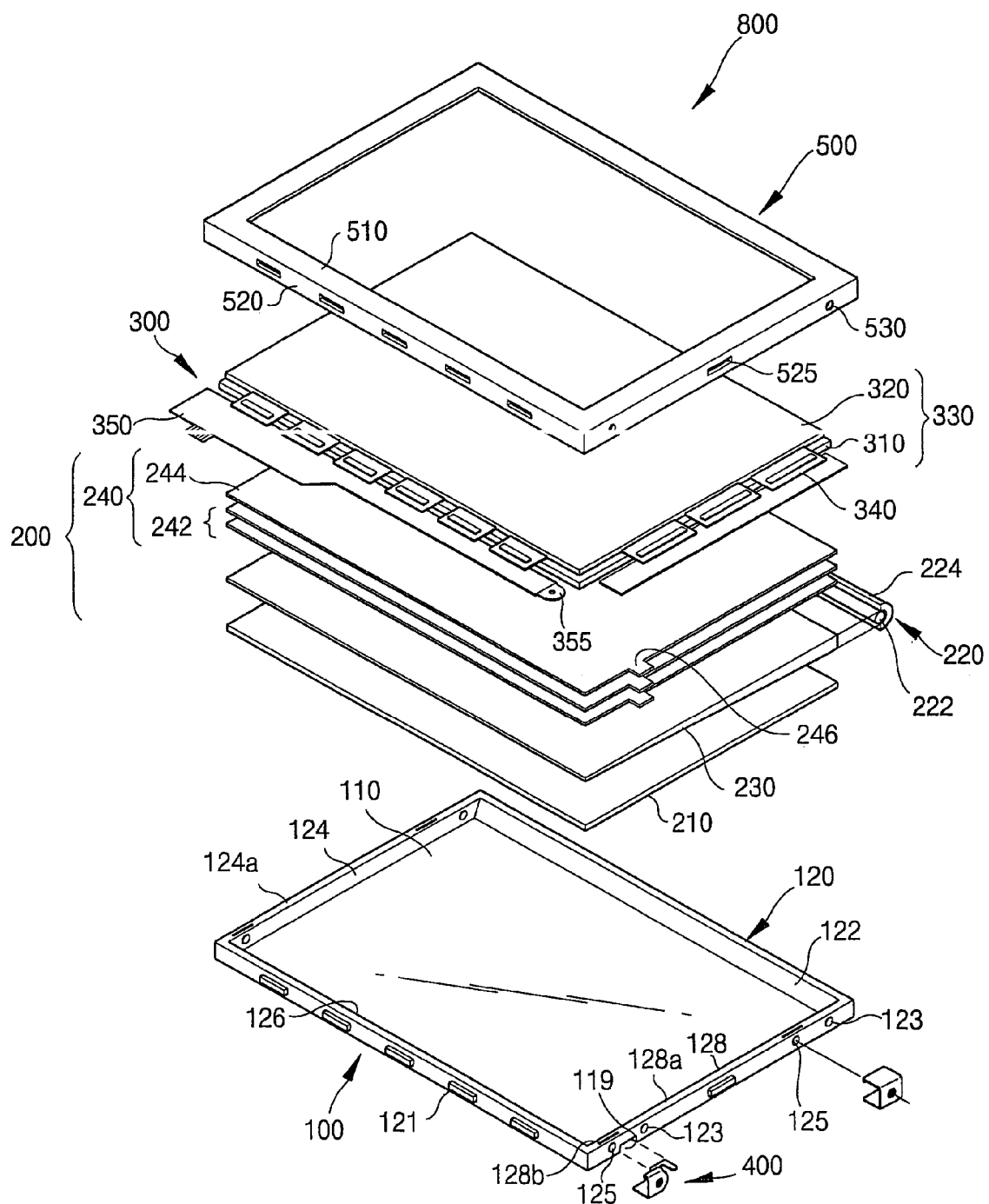
FIG. 1 is an exploded perspective view showing an LCD module according to an exemplary embodiment of the invention.

FIG. 1 is an exploded perspective view showing an LCD module according to an exemplary embodiment of the invention.

An LCD module 800 comprises a receiving container 100, a backlight assembly 200, an LCD panel assembly 300, a clip 400, and a chassis 500.

The receiving container 100 comprises a bottom surface 110 and sidewalls 120. For example, the bottom surface 110 may have a rectangular shape and holes to reduce a weight. The sidewalls 120 comprise first to fourth sidewalls 122, 124, 126, and 128. The first to fourth sidewalls 122, 124, 126, and 128 are respectively extended from four edge portions of the bottom surface 110 to provide a receiving space. The first to fourth sidewalls 122, 124, 126, and 128 are provided with a plurality of first engaging protrusions 121. Two opposite sidewalls of the first to fourth sidewalls, for example, the second and fourth sidewalls 124 and 128, may comprise first engaging openings 123. The second and fourth sidewalls 124 and 128 may be provided with chassis engaging openings 125 for engaging the receiving container 100 to the chassis 500.

The backlight assembly 200 comprises a reflecting plate 210, a lamp assembly 220, a light guide plate 230, and an optical sheet 240. The lamp assembly 220 comprises a lamp 222 and a lamp reflector 224. For instance, the lamp 222 may have a CCFL (Cold Cathode Fluorescent Lamp). The CCFL 222 has advantages such as a longer life, a lower heat, a white color light and a smaller diameter or the like. The lamp reflector 224 is disposed adjacent to the light guide plate 230 and reflects the light emitted from the CCFL 222 to increase a light efficiency.

The light guide plate 230 is disposed on the reflecting plate 210 and may have a wedge shape or a flat shape. The light guide plate 230 guides the light emitted from the CCFL 222 to the LCD panel assembly 300 after changing the light having a linear light source into a light having a surface light source.

The optical sheet 240 is disposed between the light guide plate 230 and the LCD panel assembly 300. The optical sheet 240 receives the light emitted from the light guide plate 230 and emits the light having a uniform brightness to the LCD panel assembly 300. The optical sheet 240 may comprise a diffusing sheet 242 and a prism sheet 244. The diffusing sheet 242 and prism sheet 244 are provided with a protruding portion 246 to be combined to the clip 400, respectively. The protruding portion 246 is partially extended from the diffusing sheet 242 and prism sheet 244. The prism sheet 244 may comprise two prism sheets having spectral properties different to each other.

The LCD panel assembly 300 comprises an LCD panel 330, a TCP (Tape Carrier Package) 340, and a PCB (Printed Circuit Board) 350. The LCD panel 330 comprises a TFT substrate 310, a liquid crystal molecule (not shown), and a color filter substrate 320. The LCD panel 330 controls a light transmittance of the liquid crystal molecule partially and accurately and filters the controlled liquid crystal molecule to display a desired image. The PCB 350 provides a driving signal for driving the LCD panel 330. The PCB 350 may comprise a ground part 355 for electrically grounding the PCB 350. The TCP 340 receives the driving signal from the PCB 350 and timely transfers the driving signal to the LCD panel 330. For instance, where the TCP 340 comprises a flexible material, the PCB 350 may be bent to a rear surface of the bottom surface 110 of the receiving container 100, thereby reducing an entire plane size of the LCD module 800.

The chassis 500 is combined to the receiving container 100 to prevent the LCD panel assembly 300 (which is received in the receiving container 100) from being deviated from the receiving container 100 and to prevent the LCD panel assembly 300 and CCFL 222 from being damaged by an external impact.

The chassis 500 comprises a first surface 510 that pressurizes edge portions of the LCD panel assembly 300 and a second surface 520 extended from the first surface 510 and combined to the receiving container 100. The second surface 520 is provided with first engaging holes 530 corresponding to the first engaging openings 123 of the receiving container 100 and second engaging openings 525 combined to the first engaging protrusions 121. The chassis 500, for example, may be made of aluminum or an aluminum alloy to reduce the weight thereof.

Figure 2:
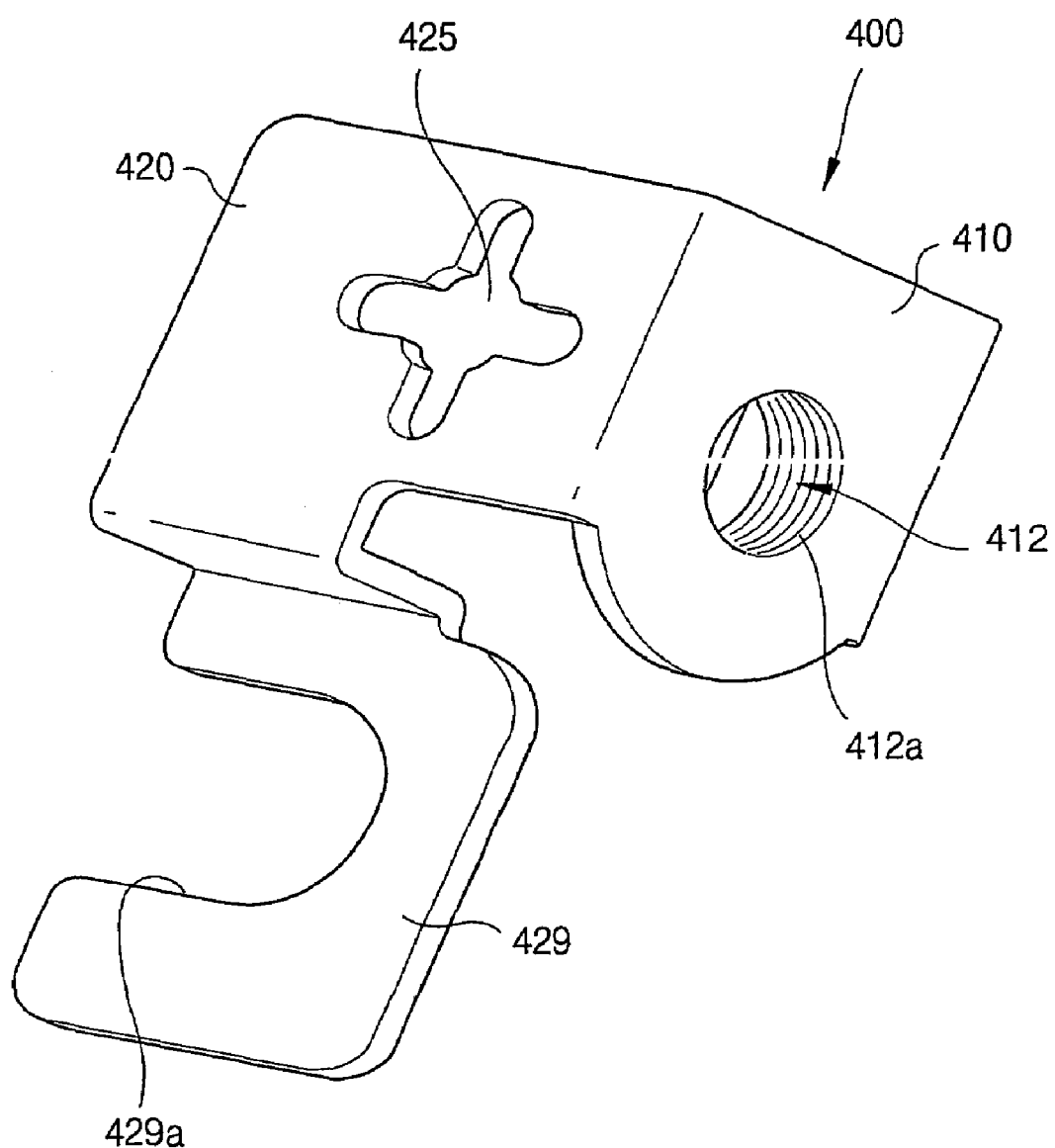
FIGS. 2 and 3 are perspective views showing a clip according to an exemplary embodiment of the invention.
Figure 3:
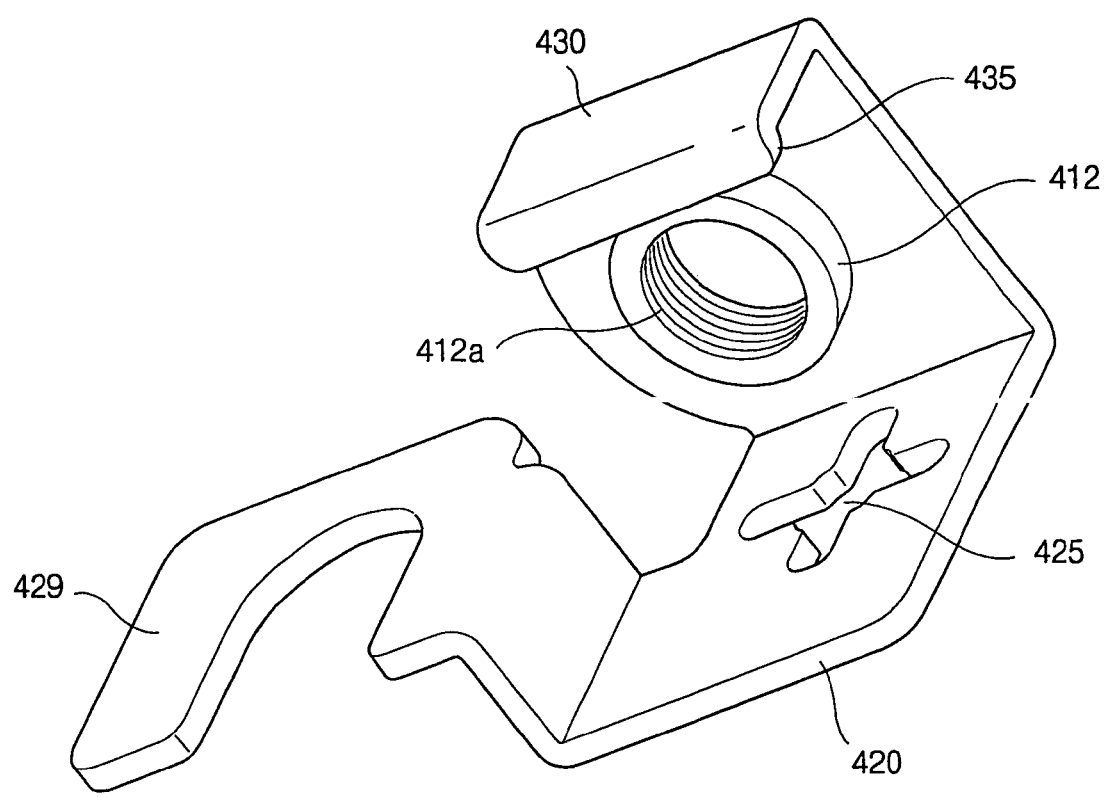
Figure 4:
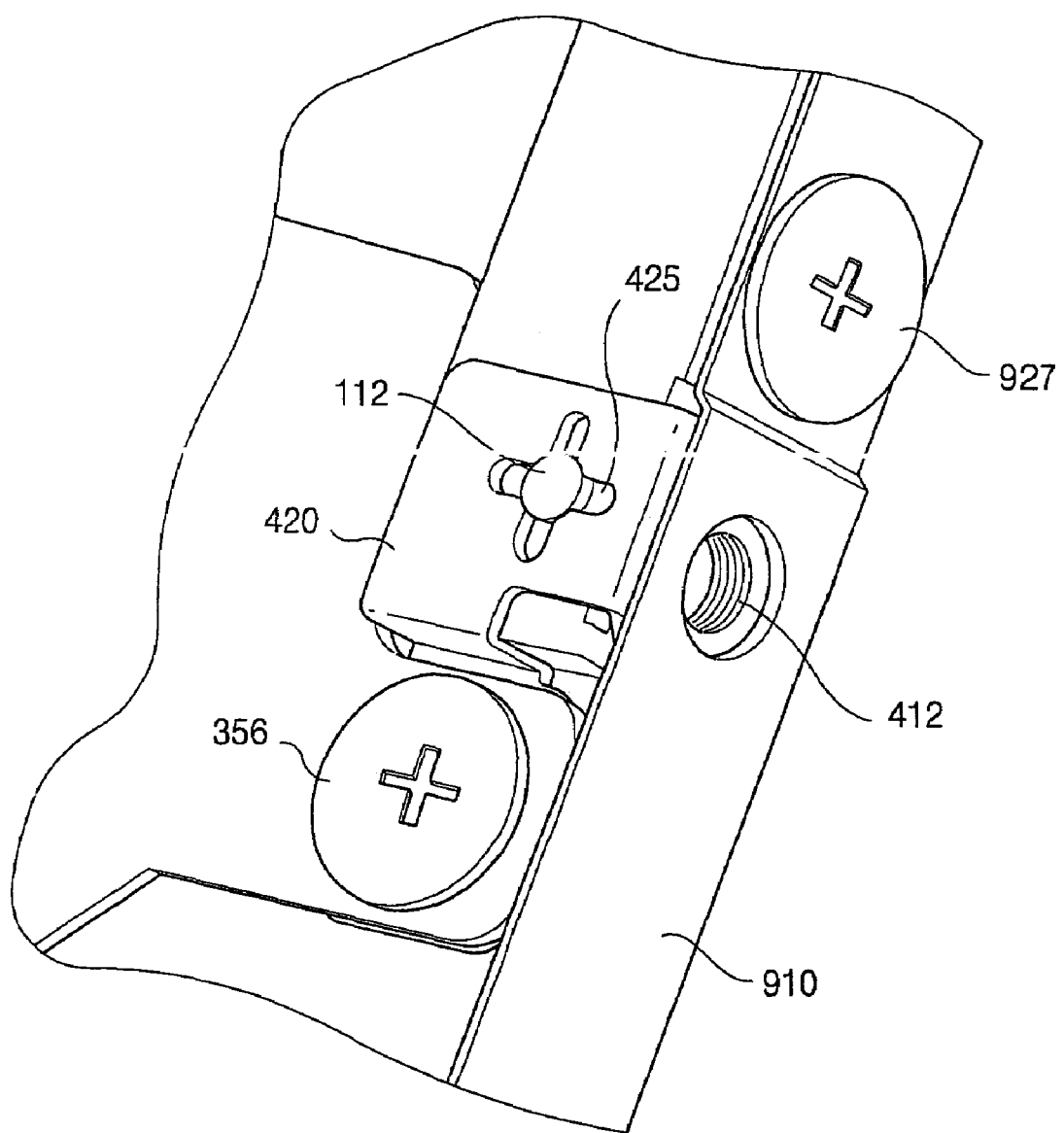
FIGS. 4 and 5 are schematic views showing a clip assembled with a receiving container and a case, according to an exemplary embodiment of the invention.
Figure 5:
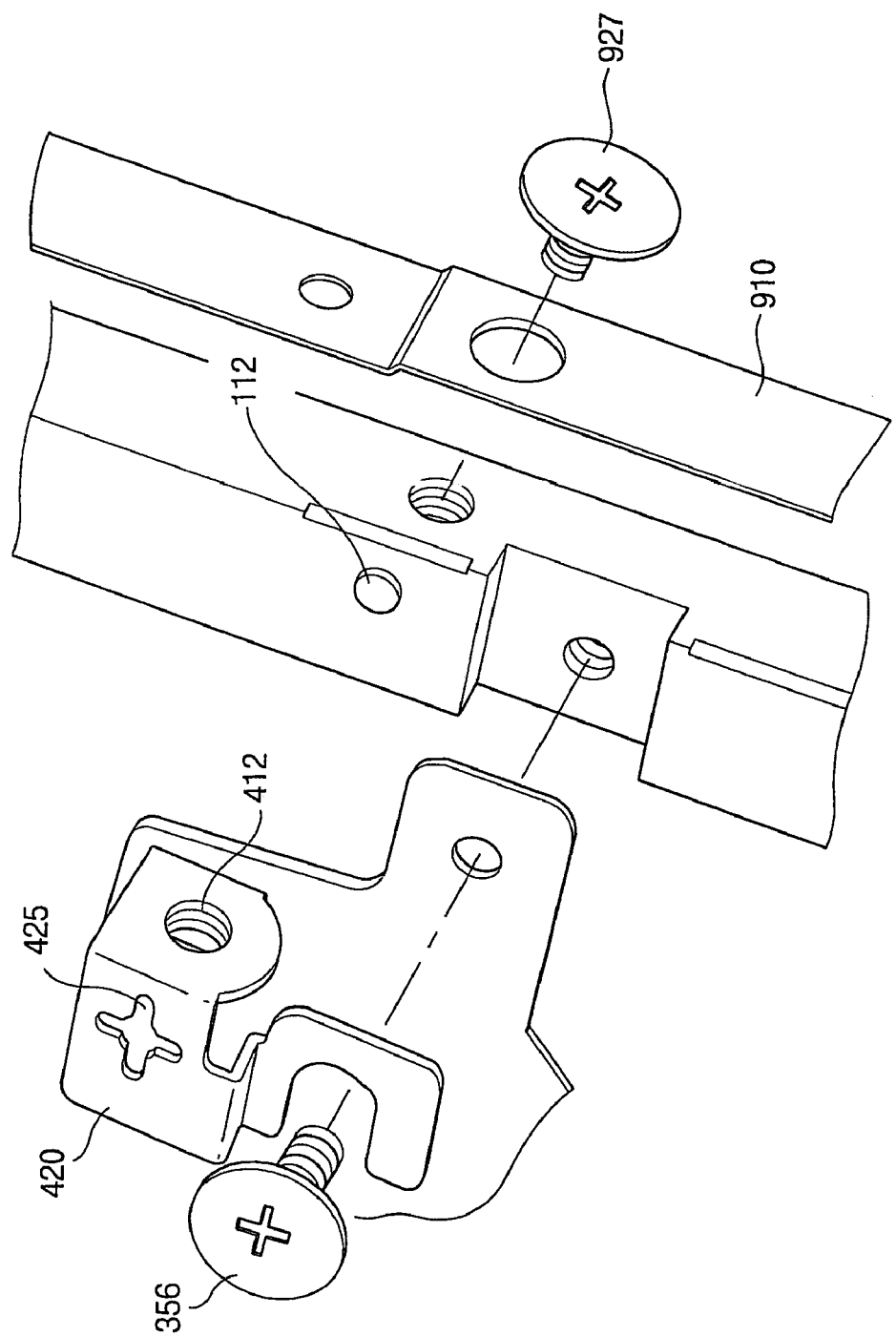

FIGS. 2 and 3 are perspective views showing a clip according to an exemplary embodiment of the invention. FIGS. 4 and 5 are schematic views showing a chip assembled with a receiving container and a case, according to an exemplary embodiment of the invention.

The clip 400 according to a preferred embodiment of the invention comprises a metal material such as a stainless steel having strength greater than that of the chassis 500. The clip 400 may be manufactured by bending a metal plate having a band shape in several times. For instance, when the metal plate is bent in three times, the clip 400 includes a first body portion 410, a second body portion 420, and a third body portion 430. The first to third body portions 410, 420, and 430 are combined to the sidewalls 120 and the bottom surface 110. For instance, the first to third body portions 410, 420, and 430 are combined to an outer surface of the second sidewall 124 of the receiving container 100, a rear surface of the bottom surface 110 of the receiving container 100, and an upper surface of the second sidewall 124 of the receiving container 100, respectively. An edge portion of the second sidewall 124 of the receiving container 100 is inserted between the second and third body portions 420 and 430 of the clip 400.

The clip 400 may be disposed at the fourth sidewall 128 of the receiving container 100 to increase strength of the chassis 500. In this case, the first to third body portions 410, 420, and 430 are combined to an outer surface of the fourth sidewall 128 of the receiving container 100, the rear surface of the bottom surface 110 of the receiving container 100, and an upper surface of the fourth sidewall 128 of the receiving container 100, respectively. An edge portion of the fourth sidewall 128 of the receiving container 100 is inserted between the second and third body portions 420 and 430 of the clip 400.

The first body portion 410, which is combined to the outer surface of the second sidewall 124 of the receiving container 100, is provided with a burring 412. The burring 412 is inserted into the first engaging opening 123 disposed on the second sidewall 124 of the receiving container 100 when the clip 400 is combined to the second sidewall 124. The burring 412 is protruded from the first body portion 410 toward the first engaging opening 123 such that the burring 412 is inserted into the first engaging opening 123. The burring 412 may comprise a diameter appropriate to be inserted into the first engaging opening 123 and a thread 412a for combining with a screw. The burring 412 may be placed at a central portion of the first body portion 410 to prevent damaging from an external impact.

The second and third body portions 420 and 430 are integrated with opposite end portions of the first body portion 410, respectively. The second and third body portions 420 and 430 are combined to the rear surface of the bottom surface 110 and upper surface of the second sidewall 124 of the receiving container 100 to prevent the first body portion 410 from being separated from the receiving container 100.

The second body portion 420 is extended from one end portion of the first body portion 410 to partially cover the rear surface of the bottom surface 110. The second body portion 420 comprises a second engaging hole 425, the receiving container 100 comprises a second engaging protrusion 112 corresponding to the second engaging hole 425 on the rear surface of the bottom surface 110 to prevent the second body portion 420 from being separated from the bottom surface 110. The second engaging hole 425, for example, has a cross shape so as to easily engage or disengage to the second engaging protrusion 112.

Figure 6:
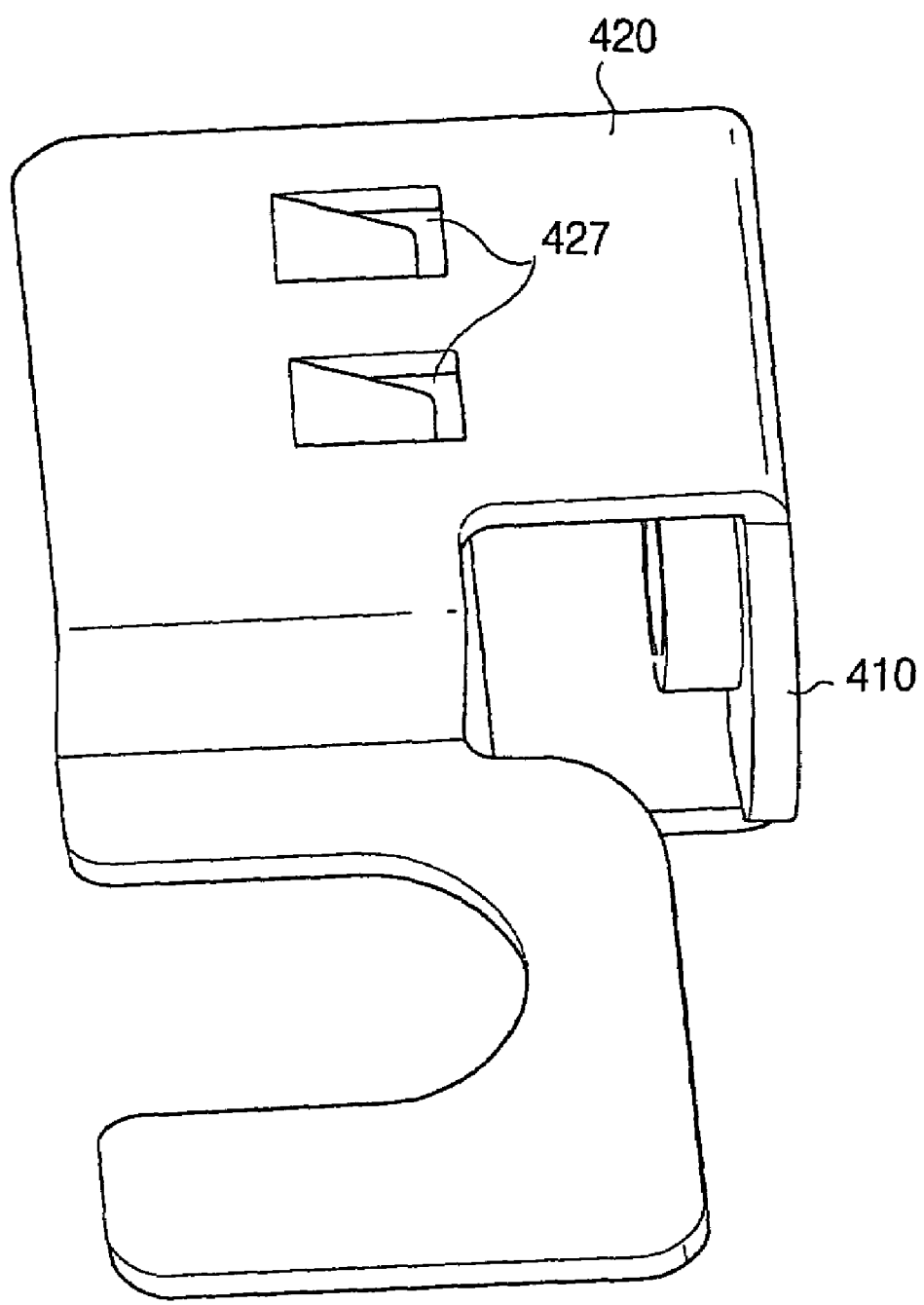
FIGS. 6 and 7 are perspective views showing a clip according to another embodiment of the invention.
Figure 7:
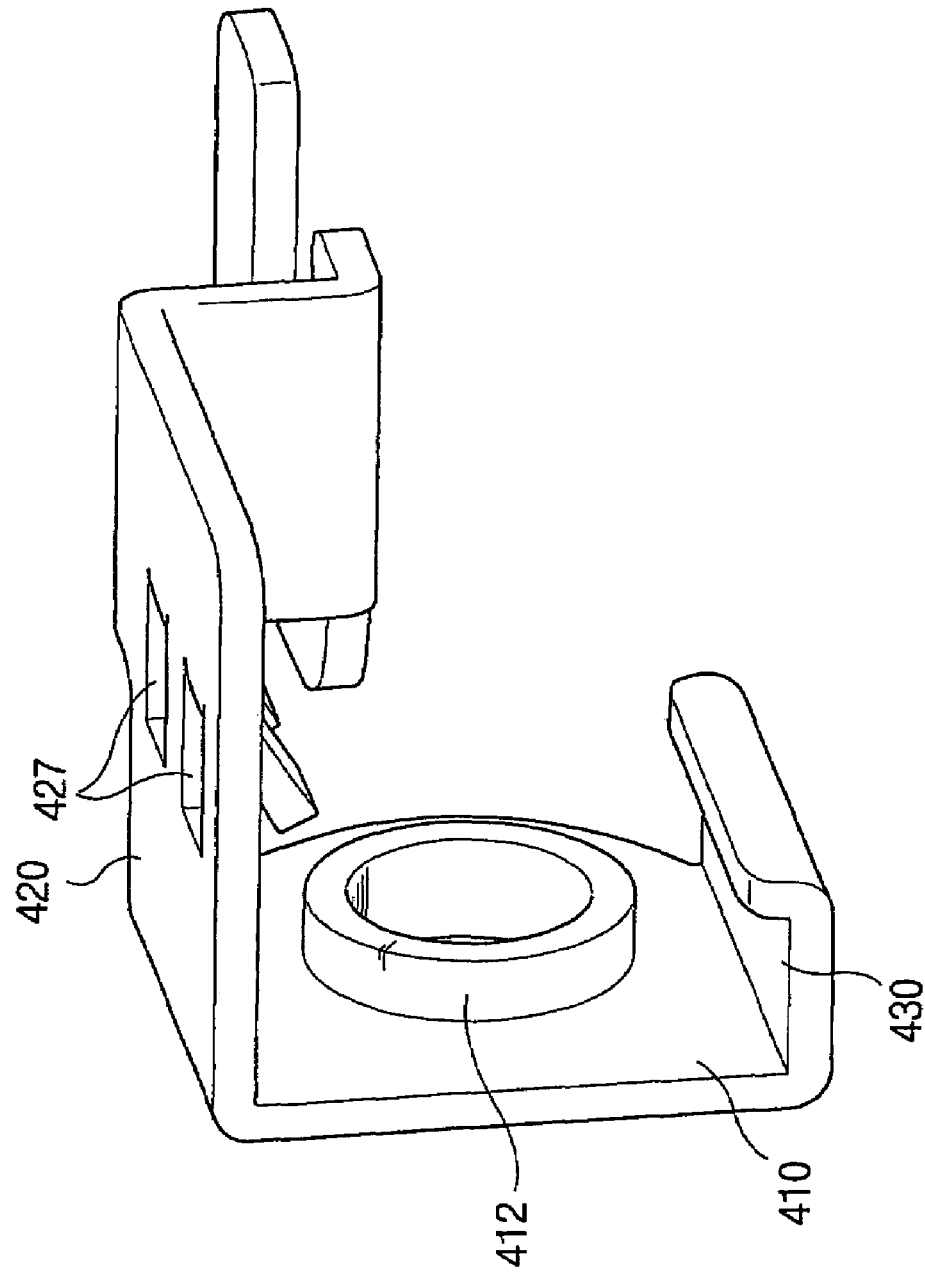
Figure 8:
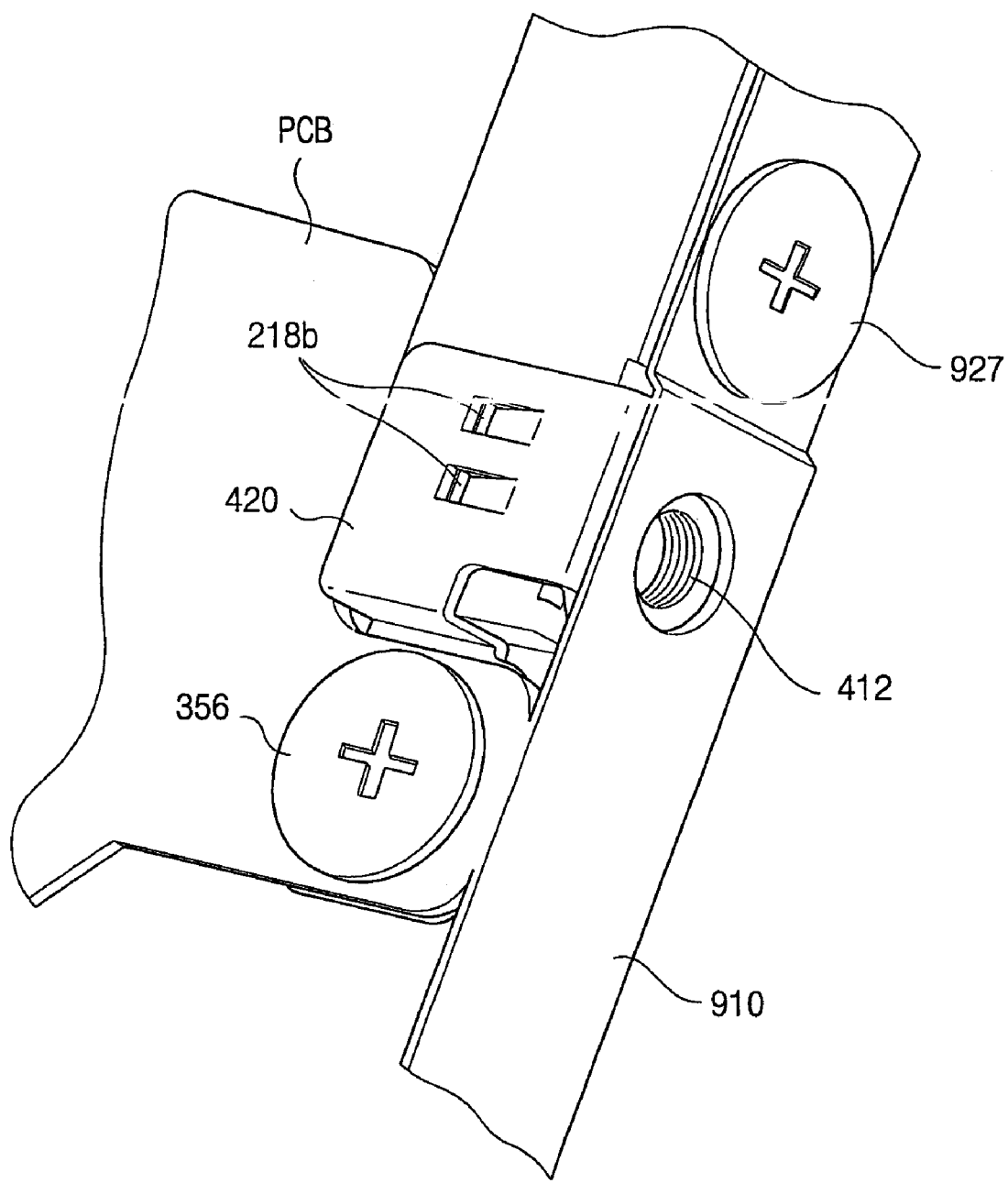
FIG. 8 is a schematic view showing a chip assembled with a receiving container and a case, according to another embodiment of the invention.

According to another embodiment of the invention, the second body portion 420 may comprise a third engaging protrusion 427. Referring FIGS. 6-8, a portion of the second body portion 420 is cut, and the cut portion is bent to the bottom surface 110 of the receiving container 100 to form the third engaging protrusion 427. The receiving container 100 may comprise a third engaging opening 218b corresponding to the second engaging protrusion 427 on the bottom surface 110. The second engaging protrusion 427 is engaged into the third engaging opening 218b to fix the second body portion 420 to the receiving container 100.

Referring to FIGS. 1 to 5, the second body portion 420 is electrically in contact with the PCB 350 of the LCD panel assembly 300. When the PCB 350 is in contact with the second body portion 420, the PCB 350 may be electrically connected to the chassis 500 and a case (not shown). The clip 400 may further comprise a ground portion 429 extended from the second body portion 420 to easily remove a static electricity from the backlight assembly 200 when the second body portion 420 is electrically connected to the LCD panel assembly 300. The ground portion 429 is provided with a third engaging hole 429a and a conductive screw 356 is screwed to the PCB 350 through the third engaging hole 429a. Thus, the ground portion 429 is electrically connected to the PCB 350. The ground portion 429 may be provided with a semicircle instead of the third engaging hole 429a.

The receiving container 100 further comprises a receiving portion 119 on the bottom surface 110 for receiving the conductive screw 356. When the ground portion 429 is connected to the PCB 350 using the conductive screw 356, the receiving portion 119 prevents a head portion of the conductive screw 356 from being exposed outside the bottom surface 110 of the receiving container 100, thereby preventing the increasing of the thickness of the LCD module 800. The ground portion 429 of the second body portion 420 may ground the PCB 350, instead of a conventional ground clip, so that a number of parts of an LCD apparatus and a number of assembling processes may be reduced.

The third body portion 430 is extended from the other end portion of the first body portion 410 such that the third body portion 430 combines to the upper surface 124a of the second sidewall 124 of the receiving container 100. The third body portion 430 may be provided with an engaging portion 435. The engaging portion 435 is formed by partially bending an end portion of the third body portion 430. The second sidewall 124 comprises a fourth engaging opening on the upper surface 124a. The engaging portion 435 is engaged into the fourth engaging opening to prevent the third body portion 430 from being separated from the upper surface 124a of the second sidewall 124 of the receiving container 100. Where the clip 100 is combined to the fourth sidewall 128 of the receiving container 100, the upper surface 128b of the fourth sidewall 128 is provided with a fifth engaging opening 128a to engage to the engaging portion 435 of the third body portion 430.

Figure 9:
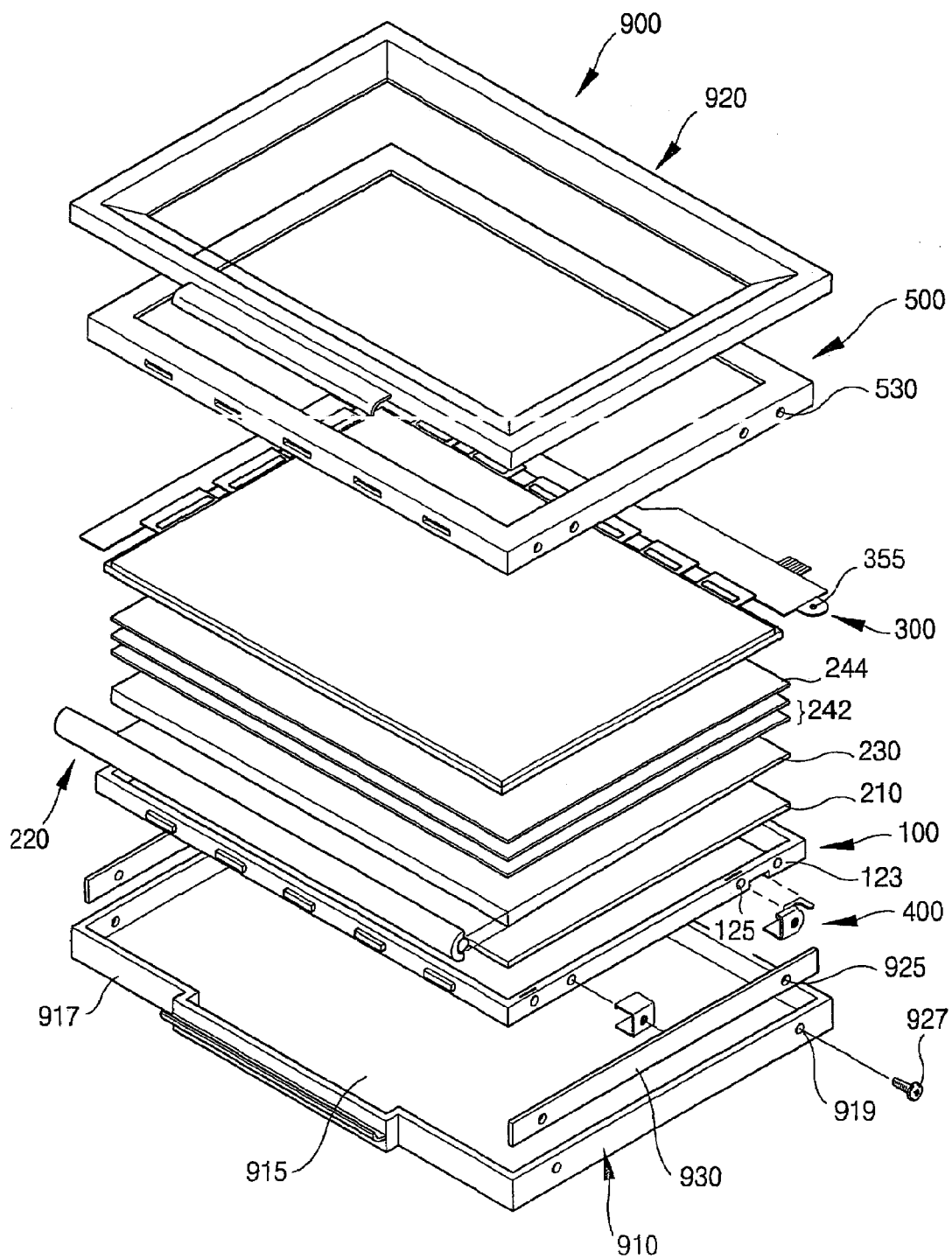
FIG. 9 is an exploded perspective view showing a structure of an LCD apparatus according to an exemplary embodiment of the invention.

FIG. 9 is an exploded perspective view showing a structure of an LCD according to an exemplary embodiment of the invention.

Referring to FIG. 9, the LCD apparatus 950 comprises a case 900, the LCD module 800, and a bracket 930.

The case 900 comprises a rear case 910 and a front case 920. The rear case 910 receives the LCD module 800. The rear case 910 comprises a bottom surface 915 and sidewalls 917 extended from the bottom surface 915. The sidewalls 917 of the rear case 910 are provided with fourth engaging holes 919 each corresponding to the burring 412 of the clip 400. The rear case 910 may be made of a magnesium alloy. The front case 920 is combined to the rear case 910. The front case 920 has a frame shape for exposing image displayed on an effective display area of the LCD module 800.

The bracket 930 is disposed between the sidewalls 917 of the rear case 910 and the chassis 500 of the LCD module 800. The bracket 930 may have a band shape to reduce intensity of the external impact applied to the LCD module 800. The bracket 930 is provided with bracket engaging holes 925 each corresponding to the burring 412 of the clip 400.

The rear case 910, bracket 930, and LCD module 800 are combined to each other by engaging screws 927. Each of the engaging screws 927 is engaged into the burring 412 of the clip 400 through the fourth engaging hole 919 of the sidewall 917 of the rear case 910, bracket engaging hole 925 of the bracket 930, and first engaging hole 530 disposed on the second surface 520 of the chassis 500. Since the rear case 910, bracket 930 and clip 400 may absorb the external impact applied to the LCD module 800, the chassis 500 may be protected from being damaged even if the chassis is made of the aluminum or aluminum alloy.

According to preferred embodiments of the invention, a LCD apparatus comprises a clip for assembling a receiving container with a chassis. The chassis is combined to the receiving container by a screw passing through the clip. The clip may be provided to opposite sidewalls of the receiving container to reinforce the strength of the chassis, thereby preventing the chassis from being damaged by an external impact and reducing a number of parts of an LCD apparatus and a number of assembling processes.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An LCD module comprising:
   a receiving container comprising a bottom surface and a sidewall extended from an edge portion of the bottom surface to provide a receiving space, the sidewall comprising a first opening formed at a side surface of the sidewall, and a second opening concavely formed at an upper surface of the sidewall;
   a backlight assembly, received in the receiving space, to generate light;
   an LCD panel assembly comprising an LCD panel and a Printed Circuit Board (PCB), the LCD panel receiving the light from the backlight assembly and displaying an image using the light and the PCB applying a driving signal to the LCD panel;
   a clip comprising a burring inserted into the first opening, the clip being fixed to an area corresponding to the first opening of the receiving container, the clip including an engaging portion which is inserted into the second opening of the sidewall, the clip forming a step with respect to the upper surface of the sidewall;
   a chassis combined to the receiving container to fix the LCD panel assembly to the receiving container, the chassis comprising a chassis engaging hole corresponding to the burring of the clip; and
   an engaging screw sequentially screwed into the chassis engaging hole and the burring inserted into the first opening to combine the chassis with the clip and the receiving container.

2. The LCD module of claim 1, wherein the clip comprises:
   a first body portion facing an outer surface of the sidewall, the first body portion comprising the burring;
   a second body portion extended from the first body portion and combined to a rear surface of the bottom surface of the receiving container; and
   a third body portion extended from the first body portion and combined to an upper surface of the sidewall of the receiving container,
   wherein the engaging portion is disposed at an end portion of the third body portion and bent at a selected angle with respect to the third body portion.

3. The LCD module of claim 2, wherein the receiving container comprises a first engaging protrusion disposed on the rear surface of the bottom surface and the second body portion comprises a first engaging hole engaged to the first engaging protrusion.

4. The LCD module of claim 3, wherein the engaging hole has a cross shape.

5. The LCD module of claim 2, wherein the receiving container comprises a third opening disposed on the bottom surface and the second body portion comprises an engaging protrusion inserted into the second opening.

6. The LCD module of claim 5, wherein the engaging protrusion of the second body portion is formed by partially cutting the second body portion and by bending the partially cut portion.

7. The LCD module of claim 2, wherein the second body portion comprises a ground portion extended from an end portion of the second body portion such that the second body portion makes contact with the PCB, and the ground portion comprises an engaging hole to pass a screw connecting the ground portion and PCB.

8. The LCD module of claim 7, wherein the receiving container comprises a receiving portion to receive the ground portion of the clip.

9. The LCD module of claim 7, wherein the receiving container comprises a receiving portion that receives the PCB and screw beneath the bottom surface.

10. The LCD module of claim 1, wherein the backlight assembly comprises a lamp to generate the light and an optical sheet to increase brightness distribution of the light emitted from the lamp, and the optical sheet comprises a protruding portion to be combined to the clip.

11. The LCD module of claim 1, wherein the chassis comprises a first metal having a first strength and the clip comprises a second metal having a second strength greater than the first strength.

12. The LCD module of claim 1, wherein the chassis comprises aluminum or an aluminum alloy and the clip comprises a stainless steel.

13. The LCD module of claim 1, wherein the clip is fixed to two opposite sidewalls of the receiving container to reinforce strength of the chassis.

14. An LCD apparatus comprising:
   a receiving container comprising a bottom surface and a sidewall extended from an edge portion of the bottom surface to provide a receiving space, the sidewall comprising a first opening and a protrusion disposed on an outer surface of the sidewall;

a backlight assembly, received in the receiving space of the receiving container, to generate light;

an LCD panel assembly to change the light emitted from the backlight assembly into an image light having image information to display image;

a clip comprising a burring inserted into the first opening, the clip covering an upper and an outer surface of the sidewall and a rear surface of the bottom surface, the clip forming a step with respect to the upper surface of the sidewall;

a chassis combined to the receiving container to fix the LCD panel assembly to the receiving container, the chassis comprising a second opening combined to the protrusion of the receiving container and a chassis engaging hole corresponding to the burring of the clip;

an engaging screw sequentially screwed into the chassis engaging hole and the burring inserted into the first opening to combine the chassis with the clip and the receiving container; and a case to receive the receiving container and chassis, the case comprising a third opening corresponding to the burring of the clip and combined to the receiving container by an engaging screw screwed into the burring passing through the third opening and chassis engaging hole.

15. The LCD apparatus of claim 14, further comprising a bracket disposed between the case and chassis, the bracket comprising a bracket engaging hole corresponding to the chassis engaging hole.

* * * * *